United States Patent [19]

Yonezu et al.

[11] Patent Number: 4,629,622

[45] Date of Patent: Dec. 16, 1986

[54] SEALED LEAD-ACID BATTERY

[75] Inventors: Kunio Yonezu; Kenji Asai, both of Kyoto, Japan

[73] Assignee: Japan Storage Battery Company Limited, Kyoto, Japan

[21] Appl. No.: 758,009

[22] Filed: Jul. 23, 1985

[30] Foreign Application Priority Data

Jul. 27, 1984 [JP] Japan .............................. 59-158199
Aug. 24, 1984 [JP] Japan .............................. 59-177156
Aug. 24, 1984 [JP] Japan .............................. 59-177157

[51] Int. Cl.$^4$ .......................................... H01M 10/06
[52] U.S. Cl. ...................................... 429/57; 429/120; 429/225
[58] Field of Search ................. 429/57, 120, 225–228, 429/204, 81

[56] References Cited

U.S. PATENT DOCUMENTS 3,862,861  1/1975  McClelland et al. ................. 429/57
4,373,015  2/1983  Peters et al. ........................... 429/57
4,383,011  5/1983  McClelland et al. ............ 429/225 X
4,546,053 10/1985  Sundberg ............................... 429/57

*Primary Examiner*—Anthony Skapars
*Attorney, Agent, or Firm*—Sughrue, Mion, Zinn, Macpeak, and Seas

[57] ABSTRACT

A sealed lead-acid battery of the absorption-at-the-negative-electrode type employing an immobilized liquid electrolyte in which stratification of the electrolyte is eliminated. In accordance with the invention, a lower part of the positive and negative plates is supplied with water formed by a reaction or phase change of substances contained within the container of the battery. In a preferred embodiment, this is done by producing a temperature difference within the container. Also, water may be provided to the lower part of the positive and negative plates by increasing the speed of certain reactions at the lower part of the negative plate relative to the upper part thereof.

11 Claims, 4 Drawing Figures

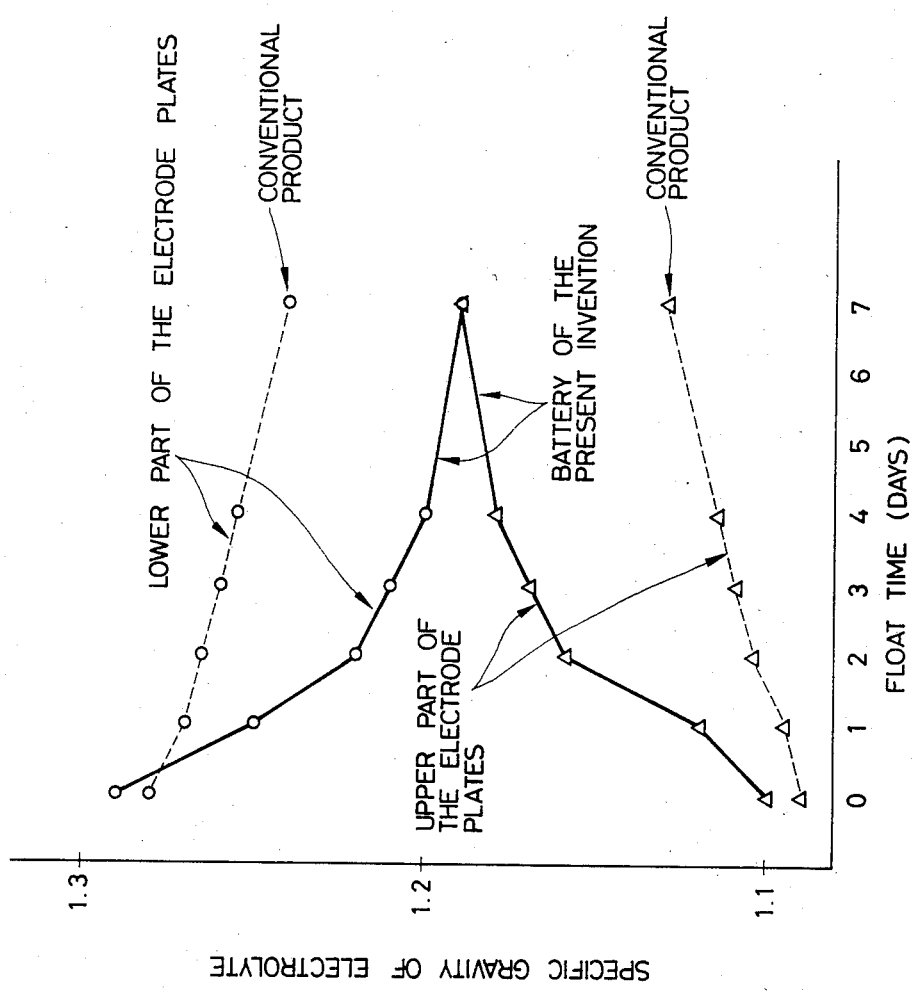

SEALED LEAD-ACID BATTERY

BACKGROUND OF THE INVENTION

The present invention relates to an improved sealed lead-acid battery of the gas recombination type wherein a liquid electrolyte is immobilized and oxygen gas evolved at the positive plate is caused to react with the negative plate.

In a conventional sealed lead-acid battery of this type, the liquid electrolyte is immobilized either in the form of a gelled fine silica powder or in the form of a mat typically made of glass fibers, and oxygen gas evolved at the positive plate moves to the negative plate and undergoes a "sealed" reaction therewith. In such a lead-acid battery, sulfuric acid in the upper part of the electrolyte is consumed in the discharging process whereas, in the charging process, sulfuric acid is released from the plates into the electrolyte and sinks to the bottom. Therefore, as discharge-charge cycles are repeated, the electrolyte stratifies, producing an upper layer containing a low concentration of the electrolyte and a lower layer containing a high concentration of the electrolyte.

In ordinary flooded lead-acid batteries using a free flowing electrolyte, stratification of the electrolyte can be readily recovered by agitation such as by gassing when in the overcharged condition or by pumping a gas into the electrolyte. On the other hand, in the sealed lead-acid battery of the type contemplated by the present invention wherein the electrolyte is immobilized, only a small degree of electrolyte stratification occurs during discharge and charge reactions, and such stratification proceeds very slowly. Additionally, due to the effects of gravity, more of the electrolyte is present at the lower part of the electrode plates or separator than at the upper part, with the result that the sealed reaction has a tendency to occur at the upper part of the negative plate more easily than at the lower part. As will be described below in more detail, however, water is formed as a result of the sealed reaction, and this makes it very difficult to avoid the occurrence of electrolyte stratification. Moreover, since the immobilized electrolyte in the sealed lead-acid battery is difficult to agitate, it is practically impossible to eliminate stratification of the electrolyte, resulting in an unavoidable capacity drop and sulfation in the lower part of the electrode plates.

SUMMARY OF THE INVENTION

These problems associated with the conventional sealed lead-acid battery of the gas recombination type using an immobilized electrolyte are solved by the present invention, which is characterized by the provision of means for supplying the lower part of positive and negative plates with water formed by the reaction or phase change of substances within a container of the battery. In a preferred embodiment, the battery of the present invention is provided with means for forming water in the lower part or bottom of the container.

The simplest and most effective way to form water is by creating a temperature difference within the container so as to condense water vapor in the lower-temperature region of the container. Another effective way is to combine hydrogen and oxygen gases with the aid of a hydrogen-oxygen recombination catalyst. In order to form water in the lower part or bottom of the container, it is very effective to make use of the sealed reaction by causing oxygen gas to contact the active material for the negative electrode more easily at the lower part thereof than at the upper part. Also, an auxiliary electrode may be connected to the negative plate through a diode so that oxygen gas will react with the active material for the negative plate to form water.

The interior of the container is essentially a closed system, and hence when water formed by the reaction or phase change of substances in the container is supplied to the lower part or bottom of the positive and negative plates, the concentration of the electrolyte is decreased in the lower part of the electrodes and increased in the upper part, thus causing the stratification of the electrolyte to disappear.

BRIEF DESCRIPTION OF THE DRAWINGS

FIG. 2 is a characteristic diagram showing the profile of disappearance of stratification from the electrolyte for both the battery shown in FIG. 1 and a conventional product.

DESCRIPTION OF THE PREFERRED EMBODIMENTS

Figure 1:
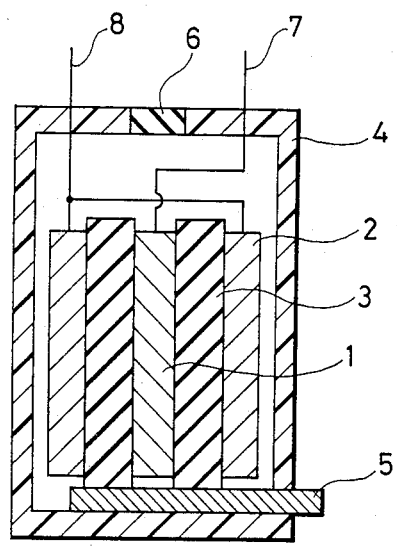
FIG. 1 is a side elevational section showing essential parts of a sealed lead-acid battery in accordance with one embodiment of the present invention.

The invention will now be explained in more detail.

The mechanism behind the formation of water which takes place when the lower part or bottom of the container is held cooler than the other part is as follows:

Assume first a sealed space containing dilute sulfuric acid. The gaseous phase of this space contains water vapor whose amount depends on the concentration (or specific gravity) of the sulfuric acid. The water vapor pressures (mmHg) in equilibrium for various specific gravities at 20° C. of dilute sulfuric acid (1.32, 1.26, 1.20 and 1.00) for various temperatures are shown in Table 1 below.

TABLE 1

| Temperature | Specific Gravity | | | |
| --- | --- | --- | --- | --- |
| (°C.) | 1.00 | 1.20 | 1.26 | 1.32 |
| 5 | 6.6 | 5.1 | 4.3 | 3.5 |
| 25 | 24 | 18 | 16 | 13 |
| 45 | 72 | 56 | 48 | 39 |
| 65 | 188 | 148 | 127 | 104 |

From Table 1 it is seen that the water vapor pressure decreases as the specific gravity of the dilute sulfuric acid increases, and as the temperature decreases, the temperature has greater effects than the specific gravity of sulfuric acid. In the sealed lead-acid battery of the gas recombination type using an immobilized electrolyte, gases are capable of diffusing or moving from one part of the container to another. Therefore, if a temperature difference is created within the container, the water vapor formed in the higher-temperature region is condensed in the lower-temperature region. In other words, liquid water is formed as a result of a phase change from the water vapor. By supplying the resulting water into the lower part of the positive and negative plates, the lower part of the electrolyte is diluted and the upper part is left in concentrated form, causing the stratification of the electrolyte to substantially disappear.

While various methods are available for creating a temperature differential within the container, the following techniques may be used to render the lower part or bottom of the container cooler than the other part:

(A) providing in the lower part or bottom of the container a cooler that uses a coolant such as cooling water;

(B) providing such a cooler outside the container in contact with the lower part or bottom thereof;

(C) providing a cool atmosphere around the lower part of the battery such as by submerging the lower part of the battery in cooling water, cooling the lower part of the battery with circulated air, or positioning the battery on a cold metal plate;

(D) heating the upper part or cover of the container; and (E) cooling the lower part or bottom of the container or heating the upper part such as with a Peltier device which produces a temperature difference by passage of an electric current.

The principal object of using these techniques is to eliminate the stratification of the electrolyte, and such techniques should be used only when a possibility of electrolyte stratification exists. That is, there is no need to form water in the lower part of the electrolyte if the battery is not in service or if it is in a floating charge cycle.

Cooling techniques have often been used in the past with large-sized lead-acid batteries, but in most cases, such batteries were cooled in their upper part in order to enhance the cooling efficiency, and water condensed on the surface of the cooler dripped onto the top of the electrolyte.

The effects of causing the sealed reaction to proceed more rapidly at the lower part of the negative plate than at the upper part are described below:

Oxygen gas evolved at the positive plate during charging undergoes a sealed reaction with the negative plate as in equation (1), and is absorbed by the negative plate, producing water:

$$\tfrac{1}{2}O_2 + Pb + 2H^+ + SO_4^{--} \rightarrow PbSO_4 + H_2O \qquad (1)$$

The mechanisms for the evolution of oxygen gas at the positive plate and the charging of lead sulfate as produced in equation (1) are expressed by equations (2) and (3), respectively:

$$H_2O \rightarrow \tfrac{1}{2}O_2 + 2H^+ + 2e \qquad (2)$$

$$PbSO_4 + 2e \rightarrow Pb + SO_4^{--} \qquad (3)$$

When the oxygen gas evolved over the entire surface of the positive plate diffuses, it moves to the lower part in preference to the upper part of the negative plate, thereby causing the sealed reaction to occur in the lower part of the negative plate more rapidly than in the upper part. The resulting increase in the amount of water formed causes the lower part of the electrolyte to be diluted and the upper part concentrated, thus causing the stratification of the electrolyte to substantially disappear.

The following methods can be used to permit the sealed reaction to occur in the lower part of the negative plate more rapidly than in the upper part:

(A) disposing a nonporous thin plate or a thin plate of less gas permeable than separators in the upper part of the space between the positive and negative plates;

(B) using a separator which is more porous in the lower part than in the upper part;

(C) using a separator which is wider at its upper part than at its lower part, or one whose lower part is cut away to expose the lower part of the negative plate; and (D) providing a negative plate for which the active material is more active in the lower part than in the upper part by, for example, increasing the surface area of the active material in the lower part of the negative plate.

EXAMPLE

An exemplary preferred embodiment of a sealed lead-acid battery constructed in accordance with the present invention will hereunder be described with reference to FIG. 1, wherein reference numeral 1 represents a positive plate, 2 a negative plate, 3 a separator made of a mat of fiberglass or hydrophilic plastic fibers or a microporous plate for retaining the electrolyte, 4 a container, 5 a cooler positioned on the bottom of the container 4 and in contact with the lower end of the separator, 6 a vent plug capable of valve action, 7 a terminal connected to the positive electrode, and 8 a terminal connected to the negative plate. The electrolyte is substantially immobilized by being impregnated in the positive plate 1, negative plate 2 and the separator 3. In the absence of the cooler 5, stratification will occur in the electrolyte as a result of discharge-charge cycles, producing a specific gravity of 1.20 at the upper part of the electrode plates and a value of 1.32 at the lower part.

Assuming that the temperature of the electrolyte is 45° C., the data in Table 1 shows that the water vapor pressure at the upper part of the electrode plates is 56 mmHg and that at the lower part is 39 mmHg, thus producing a driving force of 17 mmHg for causing a phase change in the lower part from water vapor to liquid water by condensation. If, in accordance with the present invention, the lower part of the container is cooled to 25° C. by the cooler 5, the water vapor pressure in the upper part remains 56 mmHg, but the vapor pressure in the lower part drops to 13 mmHg. This produces a driving force of 43 mmHg, which causes water to be formed about 2.5 times as fast as in the absence of the cooler. The water formed is supplied to that part of the separator 3 which is in contact with the cooler 5, and the lower part of the electrolyte is sufficiently diluted to cause the stratification to disappear from the electrolyte.

The electrolyte in the sealed lead-acid battery of the type shown in FIG. 1 was stratified into a lower layer having a specific gravity of 1.29 and an upper layer with a specific gravity of 1.10. Thereafter, the battery was subjected to floating charge at 2.27 volts/cell at 45° C. while the lower part of the container was cooled at 15° C. by means of the cooler 5. At given intervals, the densities of the upper and lower parts of the electrolyte were measured with an electrode-type specific gravity sensor. The results of the measurements are shown in FIG. 2, which also lists data for the case where the cooler is absent. As can be seen from FIG. 2, the stratification that occurred in the electrolyte in the battery cooled in the lower part of the container in accordance with the present invention substantially disappeared in three to four days, but in the absence of cooling, the stratification remained at a substantially high level even after seven days has elapsed.

Figure 3:
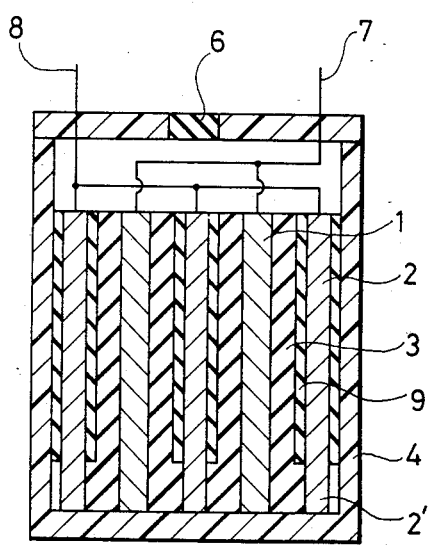
FIGS. 3 and 4 are side elevational sectional views showing two other embodiments of a sealed lead-acid battery in accordance with the present invention.
Figure 4:
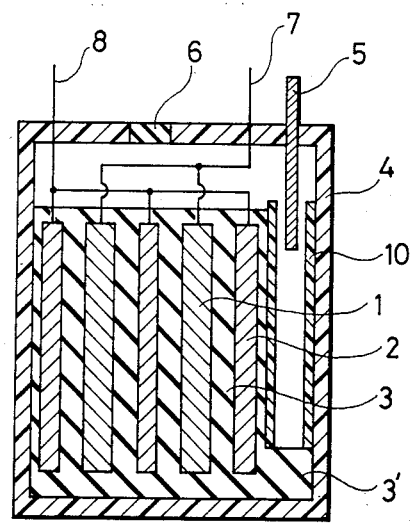

Two other embodiments of sealed lead-acid batteries in accordance with the present invention are shown in FIGS. 3 and 4, wherein operating elements that are equivalent to those shown in FIG. 1 are identified by like reference numerals. In FIG. 3, reference numeral 2' indicates the lower part of the negative plate, and 9 a microporous plate which is less gas permeable than the separator 3 and is attached to the entire surface of the negative plate 2 except at the lower part 2', which is in contact with the separator 3. Since the upper part of the negative plate 2 is in contact with the microporous plate 9 having a small gas permeability, oxygen gas evolved at the positive plate 1 does not react with this upper part as rapidly as with the lower part 2'. This means that the sealed reaction in the lower part 2' of the negative plate proceeds more rapidly to form a correspondingly increased amount of water. The water so formed is supplied to that part of the separator 3 which is in contact with the lower part 2' of the negative plate, thus causing the stratification to disappear from the electrolyte.

In the embodiment shown in FIG. 4, reference numeral 10 represents a tubular body which encircles the lower end of the cooler 5 at its upper part and which is open to a porous body 3' connected to the separator 3. With this configuration, water vapor in the upper space of the container that is in contact with the separator 3 condenses on the surface of the cooler 5 and the resulting water moves downward through the tubular body 10 and drips onto the porous body 3'. The dripping water further moves to the lower part of each of the separator 3, positive plate 1 and negative plate 2, reducing the specific gravity of the electrolyte impregnated in these components to such an extent that the stratification in the electrolyte will disappear.

As described above, the sealed lead-acid battery with immobilized electrolyte in accordance with the present invention is capable of eliminating stratification from the electrolyte that occurs as a result of repeated discharge-charge cycles. Therefore, the sealed lead-acid battery of the present invention is free from such stratification induced problems as capacity drop and sulfation at the lower part of the electrode plates, and thus will exhibit consistent performance for an extended period.

We claim:

1. A sealed lead-acid battery of the gas recombination type comprising: positive and negative plates and separators therebetween; an immobilized electrolyte substantially completely retained within said plates and separators; a container holding said positive and negative plates and said electrolyte; and means for supplying a lower part of said positive and negative plates with water formed by reaction of phase change of substances within said container, said means providing a greater amount of water to the lower part of the positive and negative plates than to upper parts of the plates.

2. The sealed lead-acid battery according to claim 1, wherein said means for supplying water comprises means for producing a temperature difference within said container for condensing water vapor in a lower-temperature region of said container.

3. The sealed lead-acid battery according to claim 1, wherein said water supplying means comprises means for forming water in a lower part or bottom of said container by causing a sealed reaction to proceed more rapidly at a lower part of said negative plate than at an upper part thereof.

4. The sealed lead-acid battery according to claim 2, wherein said means for condensing water vapor comprises means for cooling a lower inside portion of container relative to an upper inside portion of said container.

5. The sealed lead-acid battery according to claim 4, wherein said cooling means comprises a cooling using cooling water provided at a lower portion of said container.

6. The sealed lead-acid battery according to claim 4, wherein said cooling means comprises a cooler provided outside of said container in contact with a lower portion of said container.

7. The sealed lead-acid battery according to claim 4, wherein said cooling means comprises means for heating an upper portion of said container.

8. The sealed lead-acid battery according to claim 3, wherein said water supplying means comprises a nonporous thin plate disposed at an upper part of a space between said positive and negative plates.

9. The sealed lead-acid battery according to claim 4, wherein said water supplying means comprises a thin plate of less gas permeable than separators disposed at an upper part of a space between said positive and negative plates.

10. The sealed lead-acid battery according to claim 4, wherein said water supplying means comprises a separator having a lower part cut away to expose a lower part of said negative plate.

11. The sealed lead-acid battery according to claim 1, wherein said water supplying means comprises a cooler fixed to an upper portion of said container, and a tubular body encircling said cooler at an upper portion thereof and extending into an outlet at a lower portion of said container adjacent a lower part of said negative electrode.

* * * * *